United States Patent Office 3,197,269
Patented July 27, 1965

3,197,269
REACTIVE DYESTUFFS FOR CELLULOSIC TEXTILES AND PROCESS OF APPLICATION
George L. Drake, Jr., Metairie, Rita M. Perkins, New Orleans, and Wilson A. Reeves, Metairie, La., assignors to the United States of America as represented by the Secretary of Agriculture
No Drawing. Filed Nov. 23, 1962, Ser. No. 239,853
6 Claims. (Cl. 8—18)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to coloring cellulosic products and to processes for the production of these colored products. This invention is particularly useful for the production of dyed textiles.

In general, this invention relates to a new method of attaching dyes by chemical bonding to cellulosic material. The attachment of dyes to cellulose in accordance with this invention is accomplished by the reaction of aziridinyl groups with active vinyl groups or compounds capable of forming active vinyl groups under certain conditions with cellulosic hydroxyls. Dyes attached to cellulose by this method are very durable to repeated laundering.

In general, the products of this invention are prepared by impregnating cellulosic materials with a soluble sulfone containing dye derivative and a compound which contains two or more 1-aziridinyl groups and then dried. In this process the sulfone containing dye derivative reacts with the 1-aziridinyl compounds to produce an addition product. In this addition product the vinyl group is attached to the nitrogen originally in the 1-aziridinyl compound through a carbon to nitrogen covalent bond. The attachment of the dye to cellulose is achieved through a second reaction.

A particular feature of this new dyeing technique constitutes a chemical modification of cellulose. It is not important whether the 1-aziridine compound reacts with cellulose first or with the sulfone containing dye derivative first. The products of this invention are characterized by the following chemical connecting structure:

wherein,

T is a vinyl sulfone derivative;
B is a carbon or a pentavalent phosphorus atom;
O is the oxygen of a cellulose hydroxyl; and
R is a member of the group consisting of H or CH₃.

Another feature of this invention is that it provides colored cellulosic products that can undergo embossing, and other similar processes. Other objectives of the invention will be apparent to those skilled in the art as a description of the invention proceeds.

Dyes which contain a sulfone containing dye grouping with an active vinyl group have been used previously for dyeing cellulosic products. In these cases the reaction is carried out using alkaline metal salt catalysts.

It is well known that these dyes react with cotton under basic conditions and it is also known that they do not react under acid conditions.

This invention utilizes dyes under acid conditions, where they react with aziridine derivatives and become chemically bound to the cellulose.

1-aziridinyl compounds suitable for use in this invention are compounds that contain the following structure:

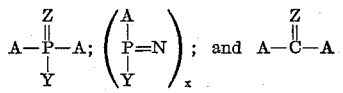

wherein, Z is oxygen or sulfur; A is:

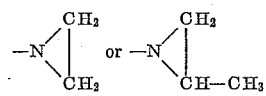

Y is a member of the group consisting of:

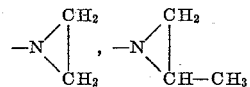

a dialkyl amine, an alkyl radical, and an aryl radical and where X is an integer of 3 to 6. Some typical examples are:

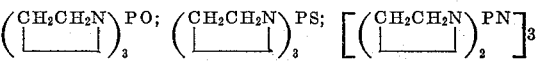

and

These 1-aziridinyl compounds can be prepared by substantially any of the known processes for producing such compounds. In general, they can be prepared by reacting ethylene imine or carbon substituted ethylene imine with the corresponding metaloid halide such as phosphrousoxychloride or phosgene in the presence of an acid acceptor such as trimethylamine.

Sulfone containing dyestuffs suitable for use in this invention are compounds that contain the following structure:

wherein, R is a member of a group consisting of

and R′ is a member of a group consisting of

—CH=CH₂, —CH₂CH₂OH, —CH₂CH₂OSO₃H

—CH₂CH₂X (where X is any halogen) or

—CH₂CH₂CCH₃

These compounds can be produced by combining a soluble azo or anthraquinone dye that contains an amino group hydroxyl, or any dye containing an active hydrogen with active sulfone containing dye derivatives or compounds capable of forming active sulfone containing dye groups under specific reaction conditions. The manner in which the sulfone containing dyes are made do not in any way limit their utility in this invention. The products contain none, one, or two groups activated by the sulfone group. They readily combine with aziridinyl compounds by opening the aziridinyl rings wherein the vinyl group or groups capable of forming vinyl groups become durably bound to the aziridinyl group. The sulfone containing group suitable for use in this invention must be soluble in the presence of dissolved aziridinyl compounds. Some examples of suitable vinyl sulfones are given below, but the invention is not limited to these samples.

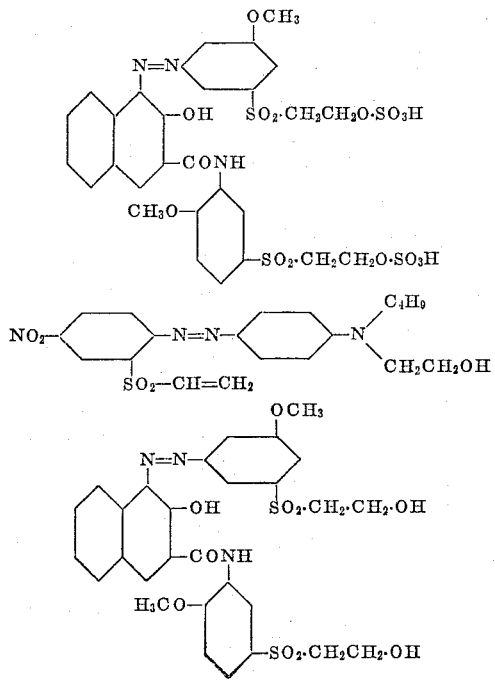

The reaction can proceed in acidic, neutral, or alkaline conditions but the reaction proceeds best under mildly acidic conditions. Surface active agents, water repellents, and other textile agents may be incorporated into the solution to modify the treated textile. The solution of sulfone containing dye derivatives and the 1-aziridinyl compounds can be caused to react in the absence of cellulose to produce a highly colored thermosetting resin.

The proportion of reactants can be varied widely depending, for example, on the particular properties desired in the final textile products. The amount of sulfone dye used will be dependent upon the amount of aziridinyl compound used and upon the intensity of the color desired. The maximum proportion of the sulfone dye that can be efficiently utilized in this process is that amount which will provide at least one active sulfone grouping per two aziridinyl groups present in the system. Dye used in excess of this amount can attach itself to the aziridine ring after opening by reaction through the H contained on the nitrogen after ring opening. Dye which is not tied up and thoroughly fixed will wash out by water rinsing. The concentration of dye in the system can be varied to produce the desired shade of color. Usually this can be accomplished by using from about two-tenths percent up to five percent dye. The 1-aziridinyl compounds are not reducing agents and hence do not alter the shade of the dye. Alteration of the dye shade is an adverse feature that characterizes systems that contain or have the potentiality of releasing reducing agents, for example, formaldehyde.

The amount of 1-aziridinyl compound used in this invention can be varied from about one percent up to about twenty percent of the weight of the textile. The amount of aziridinyl compounds that is to be used will be dependent upon the fabric properties desired. The aziridinyl compounds not only react with the sulfone containing dyes, but also react with the cellulose and in so doing modify the cellulosic properties. Reaction of the aziridinyl compounds with cellulose leads to crosslinking of cellulose molecules and therefore provides dimensional stability, wrinkle resistance, and rot resistance. Flame resistance is also important to textiles when the 1-aziridinyl compounds contain phosphorus. For maximum wrinkle resistance in a textile, about four to twenty percent of the 1-aziridinyl compound is usually needed; however, quite noticeable improvements in fabric stability, rot resistance, and wrinkle resistance can be produced with as little as two percent weight add-on of the 1-aziridinyl compound. Cellulosic textiles prepared in accordance with this invention are characterized by having dimensible stability, rot resistance, wrinkle resistance, and a durable color.

In practicing this invention, the reaction of the 1-aziridinyl compound and the sulfone containing dye with cellulose is carried out by moistening the cellulose with a solution of the compound and then drying. The manner in which the textile is dried is not an important part of this invention. This invention can be carried out using conventional textile finishing equipment. For example, a cellulosic textile can be treated by padding in a solution containing the sulfone containing dye and 1-aziridinyl compound and then dried and cured in an oven. When this process is used, both the drying and the curing can be carried out in a single step. It is not necessary that the curing step be used because the dye becomes fixed to the cellulose by merely drying the wet textile. The drying and curing operation can be carried out at temperatures ranging from about room temperature up to about 180° C. The preferred reaction temperature is between about 130° and 160° C. for times ranging from about two minutes up to about six minutes. This preferred range of reaction time and temperature also provides the maximum amount of dimensional stability, rot, and wrinkle resistance to cellulosic textiles. All cellulosic textiles prepared in accordance with this invention are insoluble in cuprammonium hydroxide solutions.

This procedure also does not limit this process to these exact conditions. For example, partial polymerization between the sulfone containing dye and the 1-aziridinyl compound can be carried out first followed by treatment of the cellulosic textiles.

This process can suitably be carried out in a number of solvents. The 1-aziridinyl compound as well as the sulfone containing dye are soluble in water and organic liquids such as benzene, ethanol, methanol, and dimethyl formamide. Often the solubility of the sulfone in a particular solvent is increased by the presence of the 1-aziridinyl compound. The preferred solvent is water which swells cellulose and allows thorough penetration by the reagents.

This invention is useful in producing dyed cellulosic goods including rayon and cotton textiles, both woven and nonwoven and dyeing blends of these cellulosic fibers with noncellulosic synthetic fibers. It is useful for the production of colored or dyed paper. Paper treated by the process has improved wet strength. Wool fibers are also quite conveniently dyed by this process. The dye is attached to the wool fiber in a manner to provide extreme durability to laundering and dry cleaning.

Glass fibers are also conveniently dyed by this process. The dye is attached to the glass fiber in a manner to provide extreme durability to laundering and dry cleaning.

A primary prerequisite of the textile fiber for suitable use in this invention is that it contains a reactive hydrogen atom such as the hydrogen in the hydroxyl groups of cellulose, the hydrogen of the amine groups in wool and silk, and the hydrogen atom in the acidic hydroxyl group in the glass fiber.

Some of the outstanding features in practicing this invention are as follows: The solutions containing reactive reagents described herein are stable and can be left for several hours without loss of utility. The color reagent that is not combined with the cellulosic fiber during the drying and curing operation can be easily and quickly removed by water rinsing. The dyes produce shades of outstanding brilliance. Because of the chemical linkage of the dye to cellulosic fibers by stable covalent bonds, the dyestuff has outstanding wet fastness. Even after several washes with hot soapy water, the loss of color is very slight. The dyed textile is unaffected by dry cleaning solvents. The light fastness of the dyed fabrics is also suitable. Treated fabrics have improved dimensional stability, rot resistance, and wrinkle resistance. The amount of wrinkle resistance is dependent upon the amount of aziridinyl compound used. With low amounts of 1-aziridinyl compound such as about one or two percent, a low degree of wrinkle resistance is obtained, but with six to twenty percent weight add-on of the 1-aziridinyl compound on cotton fabrics and comparable amounts on rayon fabrics, a very high degree of wrinkle resistance is obtained. When the 1-aziridinyl compound contains phosphorous, the finished textile also has flame resistance and glow resistance.

The following examples are given by way of illustrations and do not constitute in any way a limitation of the invention. All parts and percentages are by weight. For convenience, the compound tris-(1-aziridinyl) phosphine oxide is referred to as APO and tris-(2-methyl-1-aziridinyl) phosphine oxide is referred to as MAPO. Also, 2,2,4,4,6,6,hexakis - (1-aziridinyl) 2,4,6 - triphospha-1,3,5 triazine is referred to as APN.

EXAMPLE 1

80 x 80 bleached print cloth was processed through the aqueous solution listed in Table I. Each solution, 2 through 10, consisting of tris (1-aziridinyl) phosphine oxide (APO) and a red vinyl-sulfone dye (Reactive Red 21) containing one active vinyl group; solution 1 consisting of dye and water only; all solutions containing 1.2% of $Zn(BF_4)_2$ based on the weight of the total solution:

*Table I*

| Solution No. | Percent APO | Percent Reactive Dye | Percent $H_2O$ | pH of soln. |
|---|---|---|---|---|
| 1 | 0 | 3.0 | 95.8 | 3.4 |
| 2 | 5 | 0.5 | 93.3 | 4.3 |
| 3 | 5 | 1.0 | 92.8 | 4.8 |
| 4 | 5 | 3.0 | 90.8 | 4.7 |
| 5 | 10 | 0.5 | 88.3 | 5.2 |
| 6 | 10 | 1.0 | 87.8 | 5.1 |
| 7 | 10 | 3.0 | 85.8 | 5.1 |
| 8 | 15 | 0.5 | 83.3 | 5.2 |
| 9 | 15 | 1.0 | 82.8 | 5.4 |
| 10 | 15 | 3.0 | 80.8 | 5.3 |

The samples were padded through the above solutions using 2 dips and 2 nips with a squeeze roll pressure to give a wet pickup of about 75%. The samples were dried for 4 minutes at 85° C. and cured for 4 minutes at 155° C. They were then washed in hot running tap water for a minimum of 30 minutes, given one home laundering, using a neutral detergent, in an automatic electric washer and dried in an automatic electric clothes drier. After washing and drying, the samples had a weight increase of 3.85% to 14.0%, except the sample padded through solution No. 1, which had no noticeable increase. The colors ranged from almost white for the sample treated in solution No. 1 to deep brilliant reds for those samples treated by solutions 2 through 10. Increasing the concentration of the APO and dye usually increased the depth of color. The sample which had been treated by solution No. 7 had a resin add-on of 9.1% and a wrinkle recovery angle of 289° warp plus fill. Wrinkle recovery angle was determined with the Monsanto wrinkle tester. Untreated fabric had a wrinkle recovery angle of 163° warp plus fill.

Sample No. 9 was refluxed in 3.5% HCl for 15 minutes, then air dried. The fabric had some degree of flame resistance and left a black char.

EXAMPLE 2

A sample of 80 x 80 print cloth was processed as per Example 1, solution No. 10, except that the solution contained only 12% APO and was 5–6 hours old. The solution pH was 6.9. The sample had a weight increase of 10.4% and a WRA of 264° (W+F). The color was a brilliant red which was durable to repeated laundering.

EXAMPLE 3

Samples of 80 x 80 print cloth were padded through a solution containing 15% APO, 3% of a red monofunctional vinyl sulfone dye (Reactive Red 21), 75.5% water, and 1.2% $Zn(BF_4)_2$, all percentages based on the total weight of the solution. The padding and washing procedure was the same as per Example 1, but the drying and curing was performed as per Table II.

*Table II*

| Sample No. | Dry Time, Min. | Dry Temp., °C. | Cure Time, Min. | Cure Temp., °C. | Add-On, Percent | WRA(W+F), degrees |
|---|---|---|---|---|---|---|
| 1 | 4 | 85 | 4 | 110 | 9.9 | 244 |
| 2 | 0 |  | 4 | 110 | 9.5 | 244 |
| 3 | 4 | 85 | 4 | 140 | 13.6 | 276 |
| 4 | 0 |  | 4 | 140 | 13.6 | 278 |
| 5 | 4 | 85 | 4 | 170 | 15.5 | 290 |
| 6 | 0 |  | 4 | 170 | 14.9 | 284 |

Weight add-ons were from 9.9 to 15.5%. Brilliant dark red colors were obtained, which were durable to laundering. On ignition a black char was found.

EXAMPLE 4

Sample of 80 x 80 print cloth was treated as per example No. 1, except a black difunctional vinyl sulfone dye (Reactive Black 5) was used. Weight add-on was about 15%. The solution pH was 5.2. Samples had a high degree of wrinkle recovery (280° W+F) and a uniform coloring. On ignition, the samples burned leaving a black ash, and showed some degree of flame resistance.

EXAMPLE 5

A sample of cotton twill was padded through an aqueous solution containing 30% APO, 2.8% $Zn(BF_4)_2$, and 3% of a monofunctional red vinyl-sulfone dye (Reactive Red 21). All percentages were based on the weight of the total solution. The wet pickup was 73%, the add-on was 27.1%. The fabric was brightly colored, had a WRA of 296°, warp plus fill, and passed the standard vertical flame test with a 3-inch char length. There was no after glow from the fabric. Analyses showed 4.07% N, 2.92% P, and 0.27% S. The N to P ratio is correct for APO and the P to S ratio indicated 10 times as much APO as dye.

EXAMPLE 6

A 10-yard ½-width sample was padded through an aqueous solution containing 2% of a monofunctional red vinyl sulfone dye (Reactive Red 21), 17% of APO, 1.2% of $Zn(BF_4)_2$, and a little wetting agent. The solution pH was 6.0. The fabric was dried for 4 minutes at 85° C., cured 4 minutes at 155° by passing continuously through a gas oven. The fabric was washed on a 20-inch jig using Igepon T51 and finally oven dried. The weight increase was 14.1%. The color was a brilliant red and was durable to 5 home launderings. The WRA was 268°.

EXAMPLE 7

Same as Example 6, except a difunctional black vinyl sulfone dye (Reactive Black 5) was used. The fabric had a weight increase of 13.5%, WRA of 273°, and a deep, dark blue color which was durable to 5 home launderings.

EXAMPLE 8

A sample of paper was processed as per Example 1, solution No. 10, except that the solution contained 12%

APO. The wet pickup was 97%, and the weight increase was 13.9%. The paper had improved wet strength, was brilliant red in color, which was durable to repeated launderings. The WRA was 116°, as opposed to 69° for the untreated control (one direction only).

EXAMPLE 9

A sample of wool (standard test fabric) was processed as per Example 8. The wet pickup was 97%. The fabric had a weight increase of 10.4%, and was dark red in color.

EXAMPLE 10

A sample of oxford cloth 5.0 oz., having a cotton warp and a viscose fill, was processed as per Example 8. The fabric had a wet pickup of 70%, and a weight increase of 9.4%. The fabric was dark red in color, which was durable to repeated laundering.

EXAMPLE 11

A sample of glass fabric was treated as per Example 8. The wet pickup was 25%, the weight increase 3.0%. The glass was colored red.

EXAMPLE 12

The solution from Example 5 was placed in a gas oven at 85° C., and then the temperature was raised to 155° C. until a hard, red polymer formed. The amount of P, N, and S was found to be 10.8%, 15.10%, and 1.15%, respectively. In one mole of APO, the ratio of P to N is 71.5, and in the polymer the ratio is also 71.5. The ratio of P to S is about 10 to 1.

We claim:

1. A process for dyeing cellulosic material and chemically bonding the dye to the cellulosic material with to produce a material having the structure:

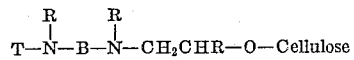

wherein T is vinyl sulfone containing dye, B is a member of the group consisting of carbonyl, phosphoryl, and thio phosphoryl, and R is a member of the group consisting of H—, and $CH_3$ comprising impregnating the cellulosic material with the dye and a 1-aziridine compound and drying the impregnated cellulosic material.

2. A process for dyeing cellulosic material comprising impregnating the cellulosic material with an aqueous solution containing from about 0.5 to 5.0% of a vinyl sulfone containing dye, from about 1 to 20% of a 1-aziridine compound and drying the impregnated cellulosic material at a temperature of from 130° to 160° C. for a period of from 2 to 6 minutes, the longer time intervals being employed with the lower temperatures.

3. The process of claim 2 wherein the 1-aziridine compound is tris (1-aziridinyl) phosphine oxide.

4. The process of claim 2 wherein the 1-aziridine compound is tris(2-methyl-1-aziridinyl) phosphine oxide.

5. The process of claim 2 wherein the 1-aziridine compound is 2,2,4,4,6,6,hexakis(1 - aziridinyl)-2,4,6-triphospha-1,3,5 triazine.

6. Colored cellulose in which a vinyl sulfone containing dye is chemically bonded to the cellulose by linkages represented by the structure:

wherein T is a vinyl sulfone containing dye B is a member of the group consisting of carbonyl, phosphoryl, and thio phosphoryl, and R is a member of the group consisting of H—, and $CH_3$—.

References Cited by the Examiner

UNITED STATES PATENTS

| | | | |
|---|---|---|---|
| 2,332,047 | 10/43 | Bock et al. | 8—54.2 X |
| 2,339,739 | 1/44 | Blackshaw et al. | 8—54.2 |
| 2,350,188 | 5/44 | Pinkney | 8—54.2 |
| 2,958,689 | 11/60 | Byland et al. | 260—144 |
| 2,994,693 | 8/61 | Blake et al. | 260—144 |
| 3,084,017 | 4/63 | Reeves et al. | 8—1.23 |

FOREIGN PATENTS 929,053 6/63 Great Britain.

OTHER REFERENCES

Chem. Abs., Part IV, Nov. 1962, p. 571, col. 1, under Ethylenimine Derivatives III—Application to Dyes: Chem. Abs., 56 (May 28, 1962), 13049.

NORMAN G. TORCHIN, *Primary Examiner.*